United States Patent
Ho et al.

(10) Patent No.: US 9,801,045 B2
(45) Date of Patent: Oct. 24, 2017

(54) SYSTEM FOR PROVIDING MULTIPLE SERVICES OVER MOBILE NETWORK USING MULTIPLE IMSIS

(71) Applicant: Taisys Technologies Co., Ltd., Taipei (TW)

(72) Inventors: Chun Hsin Ho, Taipei (TW); I Chen Hung, Taoyuan (TW); Jiunn Shyen Wu, New Taipei (TW)

(73) Assignee: Taisys Technologies Co. Ltd., Taipei (TW)

( * ) Notice: Subject to any disclaimer, the term of this patent is extended or adjusted under 35 U.S.C. 154(b) by 0 days.

(21) Appl. No.: 15/015,239

(22) Filed: Feb. 4, 2016

(65) Prior Publication Data

US 2017/0230820 A1   Aug. 10, 2017

(51) Int. Cl.
| | |
|---|---|
| *H04W 8/18* | (2009.01) |
| *H04W 8/22* | (2009.01) |
| *H04B 1/3816* | (2015.01) |
| *H04L 29/08* | (2006.01) |
| *H04W 12/06* | (2009.01) |
| *H04L 29/06* | (2006.01) |

(52) U.S. Cl.
CPC .......... *H04W 8/183* (2013.01); *H04B 1/3816* (2013.01); *H04L 63/0876* (2013.01); *H04L 67/303* (2013.01); *H04W 8/22* (2013.01); *H04W 12/06* (2013.01)

(58) Field of Classification Search
CPC ..... H04W 12/04; H04W 92/02; H04W 12/06; H04W 88/08; H04W 92/20; H04W 76/02; H04W 8/04; H04W 8/183; H04W 8/22; G06Q 20/3674; H04L 12/66; H04L 43/0811; H04L 67/303; H04L 63/0876
See application file for complete search history.

(56) References Cited

U.S. PATENT DOCUMENTS

| | | | | |
|---|---|---|---|---|
| 2010/0222104 | A1* | 9/2010 | Lee ...................... | H04B 1/3816 455/558 |
| 2011/0090874 | A1* | 4/2011 | Yang ..................... | H04B 1/707 370/335 |
| 2011/0193718 | A1* | 8/2011 | Chevrette ............... | G01D 4/02 340/870.02 |
| 2011/0294472 | A1* | 12/2011 | Bramwell .............. | H04W 8/04 455/413 |

(Continued)

FOREIGN PATENT DOCUMENTS

CN   104685935 A   6/2015

OTHER PUBLICATIONS

PCT Search Report.

*Primary Examiner* — Nizar Sivji
(74) *Attorney, Agent, or Firm* — Che-Yang Chen; Law Offices of Scott Warmuth

(57) ABSTRACT

A system for providing multiple services over mobile network using multiple IMSIs is disclosed. The system includes a mobile device and an IMSI providing server. By the operation of switching from the first IMSI to the second IMSI which are installed in the mobile device, the mobile network operators can change their role from an ISP to an ASP. Thus, data traffic, speed of the mobile network and billing system of delivering mobile internet services can be manipulated in order to meet the expectation of the OTT partners without violating the guideline of Net Neutrality of being an ISP.

10 Claims, 3 Drawing Sheets

(56) References Cited

U.S. PATENT DOCUMENTS

| 2014/0086177 | A1 | | 3/2014 | Adjakple et al. | |
|---|---|---|---|---|---|
| 2016/0182737 | A1 | * | 6/2016 | Suzuki | H04M 15/83 455/408 |
| 2016/0286377 | A1 | * | 9/2016 | Stein | H04W 4/003 |

* cited by examiner

SYSTEM FOR PROVIDING MULTIPLE SERVICES OVER MOBILE NETWORK USING MULTIPLE IMSIS

FIELD OF THE INVENTION

The present invention relates to a system for providing multiple services over mobile network. More particularly, the present invention relates to a system for providing multiple services over mobile network using multiple International Mobile Subscriber Identities (IMSIs).

BACKGROUND OF THE INVENTION

With the development of technology, Internet plays a more and more important role in daily life. Terminal equipment is linked to Interne through the connection provided by the Internet Service Provider (ISP) in earlier times. When the 3G mobile network is popular, the main stream of Internet access becomes using smart phones and tablets through mobile networks provided by Mobile Network Operators (MNOs). With hardware equipment of 3G or 4G base stations extensively spread, competition between MNOs gets increasingly intense.

Services of MNOs usually provide different service plans in order to fulfill various requirement from different customers. The service of mobile Internet access can be provided over a specific mobile network after an International Mobile Subscriber Identity (IMSI) is authenticated successfully with the secret key secured inside the Subscriber Identity Module (SIM). The service plan is normally combined with voice call service so that a smartphone installed with a SIM which stores the IMSI can provide mobile Internet access and voice services. Nowadays, mobile phone users have to pay for their mobile internet services based on the data volume which is consumed in Gigabyte or Kilobyte in order to enjoy the services. With the popularity of internet applications offering particular services such as social network, chatting, video streaming . . . , and etc. to their own subscribers over the mobile network without collaborating with the MNOs, creating a parasitic ecosystem over the mobile network built up and being maintained by the MNOs.

The business model mentioned above is called Over The Top (OTT). By using the mobile networks offered by the MNOs, service contents are provided by the service providers other than MNOs themselves. Meanwhile, the service providers don't have to pay to the MNOs for the cost of service operation. The OTTs normally provide their services in a "freemium" base, which means the users normally use them for free, so that they can quickly acquire large customer base without investment in the mobile network. With the dramatically increasing popularity of such service providers and users, it boosts the high usage of the data network and price erosions because of alternative access technologies such as Wi-Fi. The MNOs will also need to allocate much more budget over investment in network expansions and acquisitions of new bandwidth. However, based on the existing technologies that are ruing on a mobile network, there is no solution for MNOs to collaborate with the OTTs in order to manage the OTT services in the way where OTT can share the cost of the MNOs and provide quality insurance for the services.

On the other hand, due to Net Neutrality (Net Neutrality is the principle that MNOs and governments should treat all data on the Internet equally, no blocking, no throttling and no paid prioritization over the data that is supplied by an ISP to reach a legal site), MNOs can not even interfere the data from the service providers, in order to meet expectations from certain OTT partners to make profits form themselves. Such a dilemma for MNOs has been in existence for some time.

Telecom regulators such as FCC in the US and TRAI in India are starting to watch after the MNOs for the collaboration mechanisms with OTTs. MNO approaches such as "Zero-Rating" and "Blocking" for particular OTTs are likely violating the guideline of Net Neutrality and the regulators are making the rule which is keen to prohibit the MNO from any kind of manipulation over the network and billing system by providing internet service. This is further pushing the MNOs to the position of being a dumb pipe and the MNOs will be permanently facing the challenges of price erosion. Hence, the MNOs' new direction of development would be to manage Multiple IMSIs within a single mobile device where MNOs are capable to transform their roles of carries from the ISP to the ASP (Application Service Provider) by IMSI switching, giving the customers choices between legacy mobile internet and prioritized services. By making internet service an option and giving the customer choices and awareness between mobile internet and managed OTT services, MNOs can unleash themselves from the constraints of Net Neutrality and obtain the freedom to play around with the billing system and network to achieve OTT partners' expectation. More aggressively, MNO can sell IMSIs to the OTTs like M2M model in order to increase revenue stream.

Thus, the inventor has spent much time and efforts on research and design in creating a system for providing multiple services over mobile network based multiple IMSI management. The system can resolve the above issues and help the MNO manage the OTT partners. Most importantly, the system helps the MNOs to provide improved service level and personalization to their customers.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In order to resolve the issues mentioned above and provide an innovative architecture for the NMO's requirement for developing OTT business, a system for providing multiple services over mobile network using multiple IMSIs is disclosed by the present invention. The system includes: a mobile device, having: an IMSI managing software, operating to switch IMSIs for receiving respective services, and to request a specified IMSI downloaded from the IMSI providing server for respective service subscription; and an IMSI managing device, including: a secure software system, for managing a number of IMSIs and respective Subscriber Identity Module (SIM) profiles; a first IMSI, selected with a corresponding SIM profile by the IMSI managing software for the mobile device to be authenticated to access Internet or enable a subscription to a voice call service provided by a Mobile Network Operator (MNO); and a second IMSI, selected with a corresponding SIM profile by the IMSI managing software for the mobile device to be authenticated to receive services from at least one predefined Uniform Resource Locator (URL) provided by at least one service provider; and an IMSI providing server, for storing a number of IMSIs and respective SIM profiles and downloading one IMSI and corresponding SIM profile to be installed in the IMSI managing device after receiving a request from the IMSI managing software.

Preferably, the mobile device may be a smart phone or a tablet.

Preferably, the service subscribed by a requested IMSI downloaded from the IMSI providing server is a cloud service, video streaming service, operating mobile banking service, accessing Virtual Private Network (VPN), VOIP (Voice Over IP) service, Instant Messaging service, or international roaming service.

Preferably, the IMSI managing device may include a SIM card slot and a SIM card, wherein the SIM card is able to store and manage multiple sets of IMSIs and respective SIM profiles.

Preferably, the IMSI managing device may be an eSIM chip, for storing and managing multiple sets of IMSIs and respective SIM profiles.

Preferably, the eSIM chip may be embedded within a SIM card slot.

Preferably, the IMSI managing device may be a thin film SIM, wherein the thin film SIM is attached to a regular SIM card and inserted into a SIM card slot of the mobile device, for enabling the mobile device to access the IMSI and the respective SIM profile in the thin film SIM, and installing a set of IMSI and SIM profile in the thin film SIM.

Preferably, switching of IMSIs is performed by refreshing the IMSIs and corresponding SIM profile inside the mobile device.

Preferably, except the service bonded to the first IMSI and the respective SIM profile, all services are restricted to use limited network traffic.

Preferably, if the voice call service is enabled, when the IMSI is switched by the IMSI managing software, the call service remains active after switching.

The first IMSI can provide a non-directional network service. Namely, users can connect to any website or any OTT service through the mobile device over the mobile network. The second IMSI and IMSI installed after the second IMSI are directional network services. They are predefined services provided by the MNOs or cooperated service providers. This is a feature of the present invention. Meanwhile, during the operation of switching from the first IMSI to the second IMSI, the MNOs change their role from an ISP to an ASP. They won't have to be a dumb pipe. Data traffic, speed of the mobile network and billing system of delivering mobile internet services can be manipulated in order to meet the expectation of the OTT partners without violating the guideline of Net Neutrality of being an ISP.

DETAILED DESCRIPTION OF THE PREFERRED EMBODIMENTS

The present invention will now be described more specifically with reference to the following embodiments.

Figure 1:
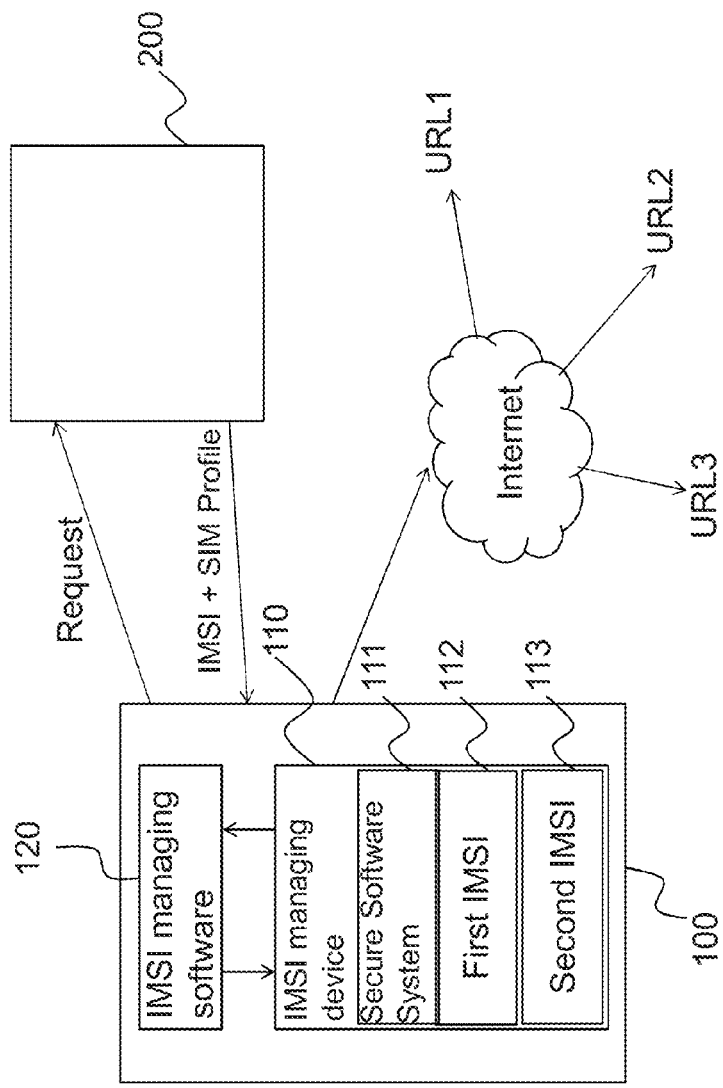
FIG. 1 shows a system for providing multiple services over mobile network according to the present invention.
Figure 2:
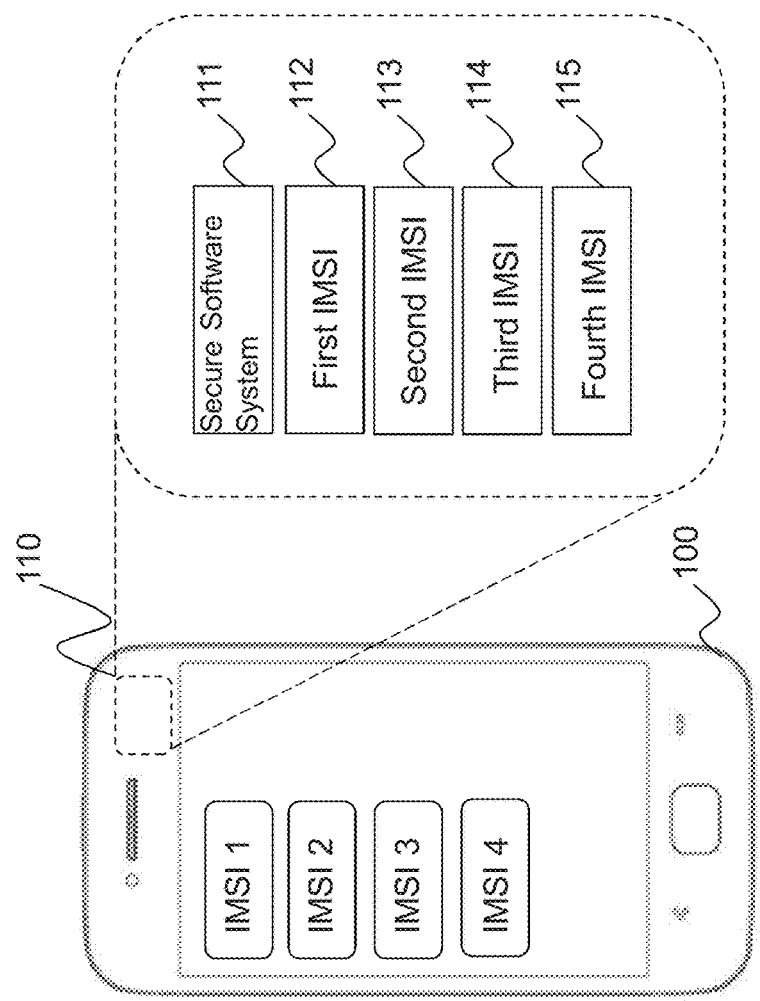
FIG. 2 shows a detailed architecture in a mobile device.
Figure 3:
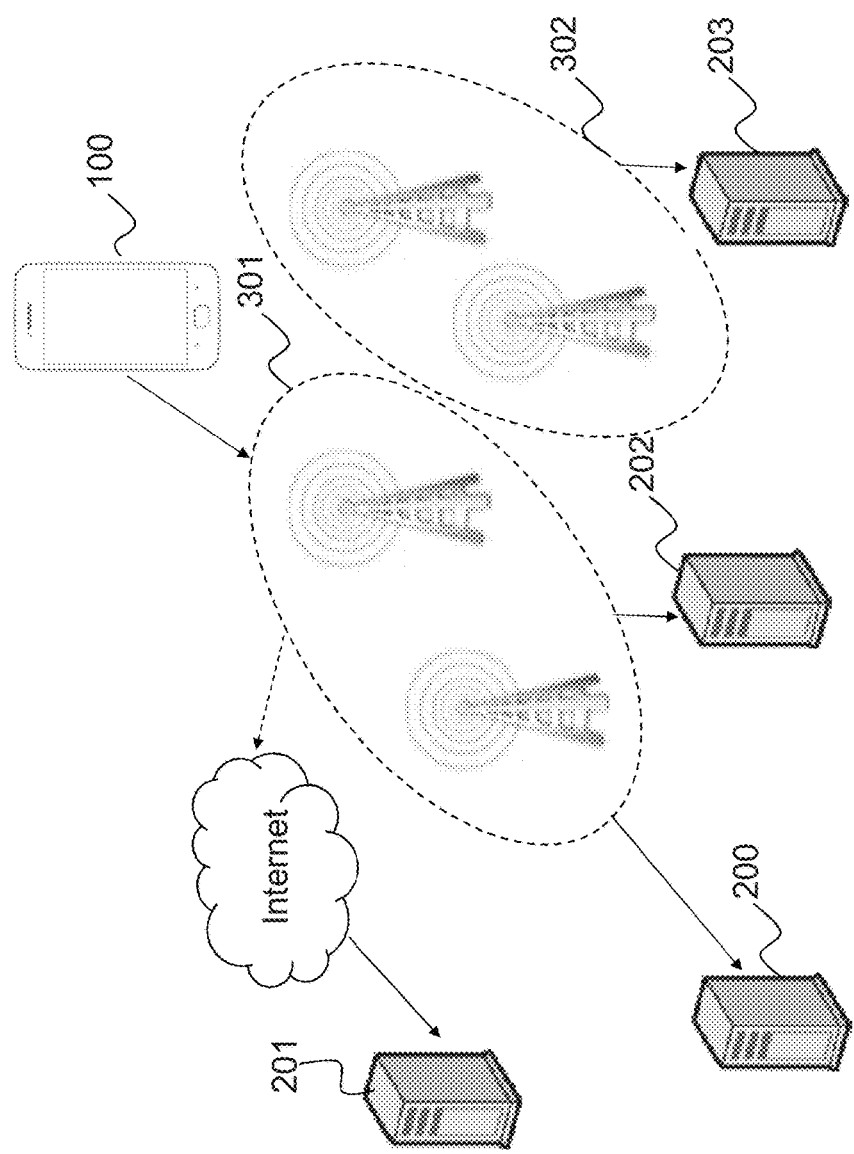
FIG. 3 shows an example of operation of the system.

Please refer to FIG. 1 to FIG. 3. An embodiment of a system for providing multiple services over mobile network using multiple IMSIs is disclosed. The main units in the system should at least include a mobile device 100 and an IMSI providing server 200. The number of mobile device 100 is not limited to 1. One mobile device 100 is only used for one user. In fact, there can be hundreds of thousands or even more mobile devices 100 running in the system. One mobile device 100 used is only to simplify description of the present invention. The mobile device 100 is a customized electronic device for an MNO to sell to their users. In fact, it may use a smart phone or a tablet which can be easily available in the market. The aspect is not limited by the present invention. However, the mobile device 100 needs to be equipped with some special designed hardware and software. Details of the mobile device 100 will be further described below.

The mobile device 100 is installed with an IMSI managing software 120. The mobile device 100 has hardware of an IMSI managing device 110. Because the IMSI managing device 110 is built inside the mobile device 100, the main structure of the IMSI managing device 110 is illustrated together with the mobile device 100 in FIG. 1. In this embodiment, the IMSI managing device 110 is a SIM card slot and a SIM card. The SIM card is able to store and manage multiple sets of IMSIs and respective SIM profiles. It should be a multi-IMSI SIM card. Some of the SIM cards may not carry IMSI and SIM profile until a set of IMSI and SIM profile are downloaded from a remote server and installed. Meanwhile, the IMSI managing device 110 may also include logic circuitry for dealing I/O of data in or out of itself. The IMSI managing device 110 therefore keeps several IMSIs and their respective SIM profiles. The SIM profile mainly includes an Authentication Key (Ki). The SIM profile and the IMSI are checked and authenticated by the base station equipment of the MNO so that further services can be available through the base station equipment over Internet.

A feature of the present invention is to prepare a space to install at least two IMSIs and freely switch them in the mobile device 100. Therefore, in other embodiments, the IMSI managing device 110 may be an eSIM chip. The eSIM chip can store and manage multiple sets of IMSIs and respective SIM profiles. It is to say that a mobile device having such unit may not need to include a physical SIM card for authentication to access Internet or use a voice call service. Particularly, the eSIM chip can be embedded within a SIM card slot. This design makes a mobile device can be installed with IMSIs before a real SIM card is inserted. If the mobile device is a smart phone, an ISP can sell the smart phone with an IMSI preloaded in the eSIM chip within the SIM card slot.

In another embodiment, there is still another way to implement the IMSI managing device 110. The IMSI managing device 110 could be a thin film SIM. In such case, the thin film SIM is attached to a regular SIM card and inserted into a SIM card slot of the mobile device 110 to enable the mobile device 110 to access the IMSI and the respective SIM profile in the thin film SIM. Meanwhile, it can install a set of IMSI and SIM profile in itself. The thin film SIM can be found in the market, for example, Slimduet™ provided by Taisys Holding Co. Ltd. It is made of a Flexible Printed Circuit Board (FPCB) bonded with a microprocessor, memory, and other active or passive components. Two sides of the FPCB also form two groups of contacts. The contacts conform to the specification of I/O contacts of a SIM card. The memory can store the multiple IMSIs and respective SIM profiles. As well, it can store some important data, such as user accounts and passwords for some online services which need to log-in before access. The processor can deal with all operations of data pass-by or data access, including installing a set of IMSI and SIM profile in a multi-IMSI SIM card or the memory therein. When the thin film SIM is attached to a SIM card and the SIM card slot of the mobile device 100, it can enable the mobile device 100 to access the IMSI and the respective SIM profile.

The IMSI managing device 110 has several key software or data: a secure software system 111, a first IMSI 112 and a second IMSI 113. The secure software system 111 is the role to manage those IMSIs and respective SIM profiles installed in the mobile device 100. Instructed by the IMSI managing software 120, the secure software system 111 can activate a service over a mobile network provided by a MNO after a corresponding IMSI is authenticated.

As mentioned above, there can be more IMSIs and their respective SIM profiles installed in the mobile device 100, or exactly defined, in the IMSI managing device 110. Two of the IMSIs are important: the first IMSI 112 and the second IMSI 113. The first IMSI 112 may be selected with a corresponding SIM profile by the IMSI managing software 120 for the mobile device 100 to be authenticated to access Internet. It may also enable a subscription to a voice call service provided by a MNO after authenticated. Sometimes, the first IMSI 112 may achieve both. The second IMSI 113 may be selected with a corresponding SIM profile by the IMSI managing software 120 for the mobile device 100 to be authenticated to receive services from at least one predefined URL (Uniform Resource Locator) which are provided by at least one service provider (contracted partner of the MNO or MNO itself) as shown in FIG. 1. Since the second IMSI 113 is switched to be active, the MNO offering Internet service or voice call service changes their role from an ISP to an ASP. They don't have to fulfill the service requests as the first IMSI 112 is active but a new service is granted to the second IMSI 113. Thus, Net Neutrality can no longer be a limitation to the "ASP". It should be noticed that the first IMSI 112 and the second IMSI 113 can be issued by different MNOs. However, it doesn't affect the operation of the service bonded to the second IMSI 113.

The URLs, e.g., URL1, URL2 and URL3 in FIG. 1, are directional. It means when one service is provided, the service provider processes Deep Packet Inspection (DPI) on all of the IP packets sent from the mobile device 100 after the second IMSI 113 and corresponding SIM profile are authenticated. If the MNO (precisely defined, the infrastructure of the MNO to enable the service) finds that an IP header of the IP packet doesn't refer to one of the predefined URLs, the IP packet will be dropped. Namely, only IP packets to the predefined URLs are sent to their destination. By DPI, the predefined URLs may not only mean the URLs the MNO would like to open for users of related services, it can also be achieved by screening out some URLs which the MNO don't want the users of the services to visit, e.g., services or platforms with huge network traffic flow such as video streaming.

One URL has a specific service. When the second IMSI 113 and corresponding SIM profile are authenticated, the URL is used to connect the mobile device 100 to the IMSI providing server 200. The IMSI providing server 200 can store a number of IMSIs and respective SIM profiles. It can also download one IMSI and corresponding SIM profile to be installed in the IMSI managing device 110 after receiving a request from the IMSI managing software 120. The service subscribed by a requested IMSI downloaded from the IMSI providing server 200 may include many aspects. For example, one IMSI can be used to connect a cloud service. Other services may be a video streaming service, operating mobile banking service, accessing Virtual Private Network (VPN), VOIP (Voice Over IP) service, Instant Messaging service, or international roaming service. Of course, the services must be provided over specific URLs. There are still many application of services which can not be completely listed within the scope of the present invention.

The mentioned services, including voice call service, can be deemed to be activated by a corresponding IMSI authenticated. In other words, each IMSI and corresponding SIM profile are bonded to a specific service. However, in the mobile device 100, only one IMSI can be active at one time. The IMSI which is not selected by the IMSI managing software 120 is not active and in a standby mode. A feature of the present invention is that except the service bonded to the first IMSI 112 and the corresponding SIM profile, all other services are restricted to use limited network traffic. With this arrangement, the MNO doesn't have to be a dumb pipe to provide almost un-limited traffic flow as their freemium clients enjoy other OTTs' services via the first IMSI 112.

Another feature of the present invention is if the voice call service is enabled, when the IMSI (no matter which IMSI) is switched by the IMSI managing software 120, the call service remains active after switching. The feature can be available by the below approach. All of the downloaded and installed IMSIs have the same Mobile Subscriber International ISDN Number (MSISDN). Therefore, all of the IMSIs stay at a parallel ringing status. Once a voice call goes through the MSISDN, each IMSI has the right to pick up the voice call as long as it is active in the mobile device 100. This feature ensures no voice call will be missed after IMSI switching.

It is obvious from the above description that the IMSI managing software 120 is also an important role in the present invention. The managing software 120 can operate to switch IMSIs for receiving respective services. It can also operate to request a specified IMSI downloaded from the IMSI providing server 200 for respective service subscription. The way the managing software 120 switches IMSI is performed by refreshing the IMSIs and corresponding SIM profile inside the mobile device. In other words, when a set of IMSI and corresponding SIM profile newly get authenticated for the bonded service, the previous active IMSI will be off to complete the switching process.

An example of operating the system in the embodiment is illustrated below. Please see FIG. 2 and FIG. 3. A user takes the mobile device 100 installed with the first IMSI 112, the second 113 and respective SIM profiles. In the beginning, the first IMSI 112 allows him to make voice calls. It is because the first IMSI 112 and corresponding SIM profile had been sent to and got authenticated by the base station equipment of the first MNO. If the first IMSI 112 further allows the user to access Internet after authentication, the user can now surf any website or visit server, e.g., a first server 201 over a first mobile network 301 of the first MNO (shown by a dashed arrow line). The first IMSI 112 may be authorized to use un-limited network traffic flow before the contract with the first MNO expires. The Internet service may also be of a certain network traffic flow. It is not limited by the present invention.

When the user would like to use other online services, he should activate the IMSI managing software 120 in the mobile device 100. Although the IMSI managing software 120 is invisible, it does run in the mobile device 100 and show an interface on a screen of the mobile device 100. For illustrative purpose, the icons shown on the interface is simplified by the IMSI the service is bonded to. For example, the IMSI 1 refers to the service bonded to the first IMSI 112 and its corresponding SIM profile, the IMSI 2 refers to the service bonded to the second IMSI 113 and its corresponding SIM profile, etc. At this stage, only the IMSI 1 icon and the IMSI 2 icon come up to the screen. When touching the IMSI 2 icon, the service to download other service is activated. The mobile device 100 is triggered to send the request to the IMSI providing server 200 through the first mobile network 301 for a set of IMSI and respective SIM profile which are bonded to a service the user wants. In this example, the user sends requests twice for two services. The IMSI providing server 200 downloads a third IMSI 114, a fourth IMSI 115 and respective SIM profiles to install in the mobile device 100. Now, the screen will show another two icons, an IMSI 3 icon and an IMSI 4 icon.

The third IMSI 114 and its respective SIM profile are used to be authenticated by the base station equipment of the first mobile network 301 before the mobile device 100 can connect and access to a second server 202. The second server 202 provides online banking service for payments. It is referred by a URL and the URL is provided after the third IMSI 114 and its corresponding SIM profile are authenticated. Contents of the URL are able to be accessed before a registration procedure is completed. The registration procedure may require a set of user name and password. However, it can be replaced by the third IMSI 114 and the corresponding SIM profile. Namely, as long as the third IMSI 114 is selected to be active by the IMSI managing software 120, the online banking service can be automatically initiated. At this moment, the first IMSI 112, the second IMSI 113 and the fourth 114 are all off.

According to the spirit of the present invention, the mobile network used is not restricted in the first mobile network 301. The first MNO can have a deal with the second MNO to sell their IMSIs bonded with other services. The fourth IMSI 115 and corresponding SIM profile are used to be authenticated by base station equipment of a second mobile network 302 before the mobile device 100 can connect and access to a third server 203. The third server 203 provides online game with limited network traffic flow and play time. It can be the only source over the second mobile network 302 so that users that play the game have to download the fourth IMSI 115. The third server 203 is referred by a URL and the URL is provided after the fourth IMSI 115 and corresponding SIM profile are authenticated. It is clear that the mobile device 100 receives each specific service over a specific mobile network after authentication. The third server 203 can not be visited even accessed through the first mobile network 301. The second server 202 can neither be accessed through the second mobile network 302. It can protect each MNO's interests this way.

The system disclosed in the present invention is better operated by a MNO. It means the MNO can setup the IMSI providing server 200 and prepare the mobile device 100 (no matter it is a smartphone or a tablet) bundled with the second SIM card 302 for sale or individually sell the second SIM card 302 (or download the second IMSI) for users to run the system. During the operation of switching from the first IMSI to the second IMSI, the MNO can change their role from an ISP to an ASP. Traffic flow caused by users' Internet access over the mobile network is reduced without been restricted by the regulation of Net Neutrality. Meanwhile, users can find more services and choose some which may be really benefit to them. Of course, the installed IMSIs may be used only for voice call service in other country. As one of such IMSI is active, users can enjoy individual voice call in different countries. It makes voice call roaming with local charge possible.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A system for providing multiple services over mobile network using multiple International Mobile Subscriber Identities (IMSIs), comprising:
    a mobile device, having:
        an IMSI managing software, operating to switch IMSIs for receiving respective services, and to request a specified IMSI downloaded from the IMSI providing server for respective service subscription; and
        an IMSI managing device, comprising:
            a secure software system, for managing a plurality of IMSIs and respective Subscriber Identity Module (SIM) profiles;
            a first IMSI, selected with a corresponding SIM profile by the IMSI managing software for the mobile device to be authenticated to access Internet or enable a subscription to a voice call service provided by a Mobile Network Operator (MNO); and
            a second IMSI, selected with a corresponding SIM profile by the IMSI managing software for the mobile device to be authenticated to receive services from at least one predefined Uniform Resource Locator (URL) provided by at least one service provider; and
    an IMSI providing server, for storing a plurality of IMSIs and respective SIM profiles and downloading one IMSI and corresponding SIM profile to be installed in the IMSI managing device after receiving a request from the IMSI managing software.

2. The system according to claim 1, wherein the mobile device is a smart phone or a tablet.

3. The system according to claim 1, wherein the service subscribed by a requested IMSI downloaded from the IMSI providing server is a cloud service, video streaming service, operating mobile banking service, accessing Virtual Private Network (VPN), VOIP (Voice Over IP) service, Instant Messaging service, or international roaming service.

4. The system according to claim 1, wherein the IMSI managing device comprises a SIM card slot and a SIM card, wherein the SIM card is able to store and manage multiple sets of IMSIs and respective SIM profiles.

5. The system according to claim 1, wherein the IMSI managing device is an eSIM chip, for storing and managing multiple sets of IMSIs and respective SIM profiles.

6. The system according to claim 5, wherein the eSIM chip is embedded within a SIM card slot.

7. The system according to claim 1, wherein the IMSI managing device is a thin film SIM, wherein the thin film SIM is attached to a regular SIM card and inserted into a SIM card slot of the mobile device, for enabling the mobile device to access the IMSI and the respective SIM profile in the thin film SIM, and installing a set of IMSI and SIM profile therein.

8. The system according to claim 1, wherein switching of IMSIs is performed by refreshing the IMSIs and corresponding SIM profile inside the mobile device.

9. The system according to claim 1, wherein except the service bonded to the first IMSI and the respective SIM profile, all services are restricted to use limited network traffic.

10. The system according to claim 1, wherein if the voice call service is enabled, when the IMSI is switched by the IMSI managing software, the call service remains active after switching.

* * * * *